United States Patent [19]

Takasugi et al.

[11] Patent Number: 5,358,021
[45] Date of Patent: Oct. 25, 1994

[54] PNEUMATIC TIRE HAVING ASYMMETRIC TREAD PATTERN

[75] Inventors: Motohide Takasugi; Kazuyoshi Saneto; Masatoshi Kuwajima, all of Hiratsuka, Japan

[73] Assignee: The Yokohama Rubber Co., Ltd., Tokyo, Japan

[21] Appl. No.: 38,689

[22] Filed: Mar. 29, 1993

[30] Foreign Application Priority Data

May 29, 1992 [JP] Japan ................. 4-138563

[51] Int. Cl.⁵ .............................................. B60C 11/04
[52] U.S. Cl. ................................. 152/209 A; 152/209 R
[58] Field of Search ............. 152/209 R, 209 A, 209 B

[56] References Cited

U.S. PATENT DOCUMENTS 4,732,194  3/1988  Saneto et al. ................... 152/209 R

FOREIGN PATENT DOCUMENTS 3815829 12/1988 Fed. Rep. of Germany ... 152/209 A
762999   8/1971  France ............................. 152/209 A
147901   9/1982  Japan .............................. 152/209 A
61-98601 5/1986  Japan .
6204     1/1990  Japan .............................. 152/209 A Primary Examiner—Geoffrey L. Knable
Attorney, Agent, or Firm—Nikaido, Marmelstein, Murray & Oram

[57] ABSTRACT

In a pneumatic tire having an asymmetric tread pattern in witch ribs continuing in a tire circumferential direction are disposed on a tread surface at a shoulder end portion on the outer side of a vehicle when the tire is fitted to the vehicle, and block lines each comprising a plurality of blocks are disposed at a shoulder end portion on the inner side of the vehicle, wherein sub-grooves extending in a tire width-wise direction while forming right and left pairs are disposed on the portion of the tire more inward than the ribs at a predetermined pitch in the tire circumferential direction and in a herringbone pattern widening in a direction opposite to a rotating direction of the tire, the apexes of the herringbone patterns are positioned on the outer side of the tire with respect to a tire equator line, and pairs of the right and left sub-grooves are made mutually discontinuous at the apexes.

3 Claims, 4 Drawing Sheets

PNEUMATIC TIRE HAVING ASYMMETRIC TREAD PATTERN

BACKGROUND OF THE INVENTION

This invention relates to a pneumatic tire having an asymmetric tread pattern. More particularly, it relates to a pneumatic tire capable of improving driving performance on a wet road surface and reducing noise during driving while keeping excellent driving performance on a dry road surface.

A pneumatic tire having an asymmetric tread pattern wherein ribs continuing in a tire circumferential direction are disposed at a shoulder end portion on a tread surface on the outer side of a vehicle when the tire is fitted to the vehicle, and block lines each comprising a plurality of blocks are disposed at a shoulder end portion on the inner side of the vehicle exhibits excellent driving performance on a dry road surface because its outer shoulder end portion is constituted by ribs having high rigidity. It is known generally that such a pneumatic tire exhibits excellent wear resistance even under a critical state such as in circuit driving because the shoulder end portion on the outer side of the vehicle comprises the ribs having high rigidity and the tire does not have relatively sharp block edges.

However, though this pneumatic tire has no problem of draining property on a wet road surface having a relatively small depth of water, it involves inferior drainability when the depth of water is great because the shoulder portion on the outer side of the tire with respect to the vehicle consists of the ribs. Various attempts have been made so far to solve these problems by, for example, increasing the void volume of the tread, or by employing an asymmetric profile as disclosed in Japanese patent application Kokai publications No. 57-147901 and No. 61-98601. However, these methods have not been entirely satisfactory because they invite the drop of other items of tire performance.

Also, lately it has been increasingly strongly demanded from the viewpoint of the environmental integrity that noise generation occurring when vehicles are run should be suppressed, and the above described tires having remarkable dry performance are not excluded in this respect. Tires the tread pattern of which is asymetrical and comprises a rib at the shoulder end on the outer side in the condition in which they are mounted to wheels of a vehicle have a feature such that they do not have a continuous lug groove in the outer rib in contrast to such tires of which the tread pattern comprises a block-based pattern over a whole tread area, and basically such feature ought to be advantageously influential upon supression of the noise generation. However, a pair of tires, one for a left and the other for a right wheels of a vehicle, are produced by a same molding die, so that in mounting such tires to the vehicle, either of the two tires has to be reversed in the mounting-position relative to the other so that the outer rib of each tire is on the outer side of the vehicle. If the tire mounting is made in that way, then a basic direction of inclination of sub-grooves extending in the widthwise direction of the tires falls to be identical in connection with the left tire and the right tire on the vehicle, whereby a difference in the block rigidity is produced between the left tire and the right tire, possibly resulting in a large difference in the noise generation between the left side and the right side of the vehicle.

SUMMARY OF THE INVENTION

It is an object of the present invention to provide a pneumatic tire accomplishing simultaneously an improvement in driving performance on a wet road surface while keeping driving performance on a dry road surface, and reduction of noise during driving.

In a pneumatic tire having an asymmetric tread pattern in which ribs continuing in a tire circumferential direction are disposed on a tread surface at a shoulder end portion on the outer side of a vehicle when the tire is fitted to the vehicle, and block lines each comprising a plurality of blocks are disposed at a shoulder end portion on the inner side of the vehicle, the object described above can be accomplished by a pneumatic tire wherein sub-grooves extending in a tire width-wise direction while forming right and left pairs are disposed on the portion of the tire more inward than the ribs at a predetermined pitch in the tire circumferential direction and in a herringbone pattern widening in a direction opposite to a rotating direction of the tire, the apexes of the herringbone patterns are positioned on the outer side of the tire with respect to a tire equator line, and pairs of the right and left sub-grooves are made mutually discontinuous at the apexes.

Since the pneumatic tire of this invention has the asymmetric pattern in which the ribs continuing in the tire circumferential direction are disposed at at least the shoulder end portion on the outer side of the vehicle, maneuvering stability during high speed driving on a dry road surface and wear resistance under a critical state are improved by high tread rigidity based on the outer-side ribs.

The sub-grooves extending in the tire widthwise direction are disposed in the herringbone pattern on the portion of the tire more inward than the ribs, the apexes of the herringbone pattern are disposed on the outer side of the tire than the tire equator, and the apexes are brought into substantial conformity with the centroid of a tire ground contact area during turning on the wet road surface. Accordingly, draining can be made efficiently through the sub-grooves extending in the herringbone pattern. In this way, driving performance on the wet road surface can be improved while keeping driving performance on the dry road surface which is improved by the asymmetric tread pattern in which the ribs are provided at the outside shoulder end portion as described above.

In addition to the disposition of the ribs at the outside shoulder end portion, pairs of right and left sub-grooves are made mutually discontinuous at the apexes of the herringbone pattern so as to prevent the formation of block edges at mutually adjacent positions on the ground contact front end side. Therefore, noise occurring during driving can be reduced while securing the draining property described above. Moreover, since the sub-grooves having the herringbone pattern widen in a direction opposite to the rotating direction of the tire and impart directivity to the tire having the asymmetric tread pattern. Therefore, the tread patterns of the right and left tires when they are fitted to the vehicle can be brought into mirror symmetry with respect to the center of the vehicle, so that the noise occurring during driving can be made equal on both right and left sides of the vehicle, and the difference of the noise between the right and left sides can be reduced.

DESCRIPTION OF THE PREFERRED EMBODIMENTS

Figure 1:
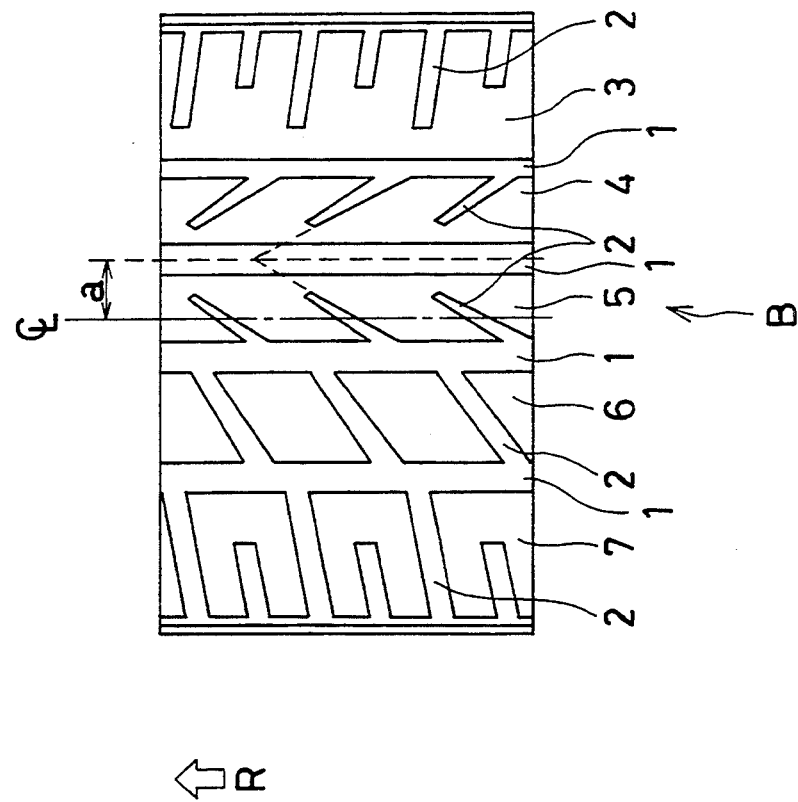
FIG. 1 is a development view showing a tread surface of a pneumatic tire according to the present invention.
Figure 1:
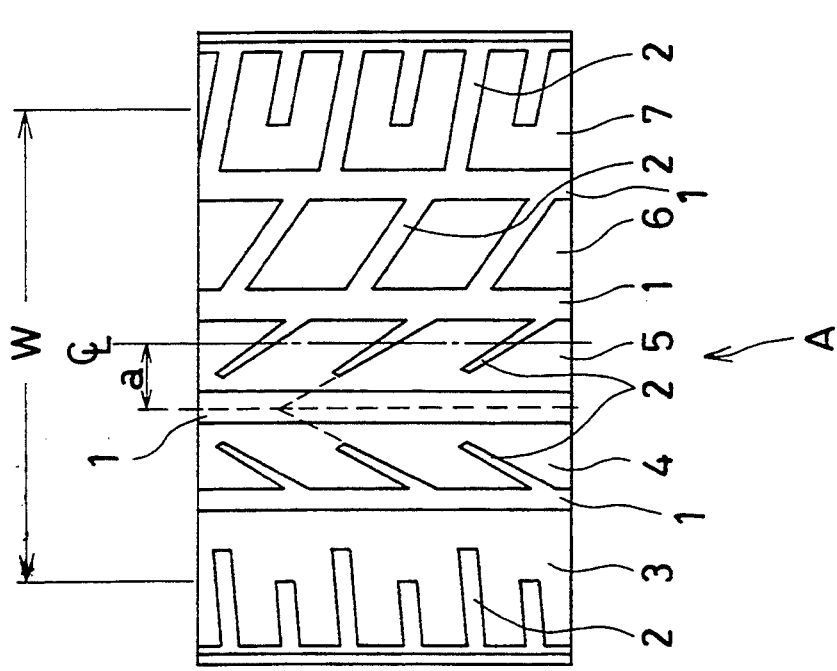

In FIG. 1, symbol A represents a tread surface of a tire fitted to the left side of a vehicle, symbol B represents a tread surface of a tire fitted to the right side, and symbol R represents a rotating direction of the tire when the tire is observed from upper side of the vehicle. A plurality of main grooves 1 extending in a tire circumferential direction and a plurality of sub-grooves 2 extending in a width-wise direction of the tire are disposed on each of the tread surfaces A and B. These main grooves 1 and sub-grooves 2 dividedly define ribs 3 continuing in the tire circumferential direction, at shoulder end portions on the outer side of the vehicle. Also, ribs 4 and 5 and block lines 6 and 7 are formed sequentially and dividedly from these ribs 3 toward the inner side of the vehicle. Each of the block lines 6, 7 comprises a plurality of blocks.

The sub-grooves 2 are symmetrically paired and describe a herringbone pattern that widens toward the end in a direction opposite to the tire rotating direction R, and are arranged at a predetermined pitch in the tire circumferential direction. The apexes of the herringbone pattern of the sub-grooves 2 are spaced apart by a distance a from a tire equator line CL toward the outer side of the tire, and are ribbed in such a way that pairs of right and left sub-grooves 2 are discontinuous to one another. One main groove 1 is disposed at the apex portion of each pair of right and left sub-grooves 2. This main groove 1, too, is discontinuous to the pair of right and left sub-grooves 2.

The pneumatic tire according to the present invention has an asymmetric tread pattern in which the ribs 3 having a higher rigidity than the block lines are disposed at the shoulder end portion on the outer side of the vehicle as described above. Therefore, this pneumatic tire has excellent maneuvering stability during high speed driving on a dry road surface and high wear resistance under a critical state. Further, because the apexes of the sub-grooves 2 having the herringbone pattern are positioned on the tire outer side from the tire equator line, these apexes are located at the positions which are most suitable for drainage on deformation of the ground contact shape of the tire during turning on the wet road, and drainage is effected efficiently through these sub-grooves 2. Accordingly, driving performance on the wet road surface can be improved while the tire maintains driving performance on the dry road surface which is improved by the asymmetric tread pattern. Furthermore, when the main groove 1 extending in the tire circumferential direction is disposed at the apex portions of the pair of right and left sub-grooves 2 as described above, driving performance on the wet road surface can be further improved.

Figure 2:
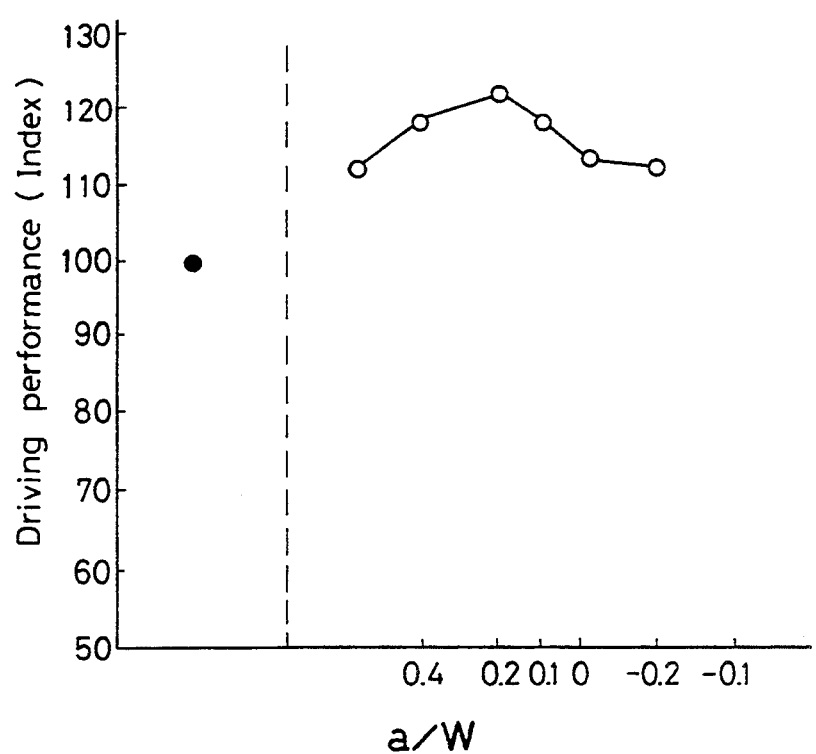
FIG. 2 is a diagram showing the relation between a/W in FIG. 1 and driving performance on a wet road surface.

The following result is obtained when the relation between the tread ground contact width W and the distance a of the apex of the herringbone pattern of the sub-grooves 2 from the tire equator line CL is examined. FIG. 2 shows driving performance when test tires (o) having various a/w values and test tires (●) not having the apex portion of the herringbone pattern were fitted to the right and left wheels of vehicles, respectively, and when driving was switched from driving on a dry road surface having a radius of 100 m to driving on a wet road surface. In FIG. 2, when a/W is positive, it represents that the apex exists on the outer side from the tire equator line CL and when a/W is negative, it represents that the apex exists on the inner side from the tire equator line CL. Driving performance is expressed by transverse acceleration which occurs in the vehicle on the wet road surface and which is represented based on an index value of 100 for the test tire not having the apex portion of the herringbone pattern. The greater this index value, the more excellent becomes driving performance. In this test, the term "tread ground contact width W" represents the ground contact width when each test tires was brought into touch with the ground by the load of the test vehicle at a set pneumatic tire pressure for the test.

As can be seen from FIG. 2, the ratio a/W is preferably within the range of 0.1 to 0.4. If this ratio a/W is less than 0.1 or greater than 0.4, driving performance on the wet road surface drops.

The present invention improves driving performance on the wet road surface while keeping driving performance on the dry road surface as described above. However, if the pair of the right and left sub-grooves 2 are so formed as to be continuous with one another at the apex portions of the herringbone pattern, block edges are continuously formed at portions in the vicinity of the ground contact front end side, and noise generated during driving becomes great. Therefore, this noise is reduced by making the pair of right and left sub-grooves 2 discontinuous at the apex portion of the herringbone pattern.

The sub-grooves 2 having the herringbone pattern are so formed as to widen in the counter-rotating direction of the tire to impart directivity to the tire. Therefore, the tread patterns of the right and left tires can be arranged to have mirror symmetry with respect to the center of the vehicle when the tires are fitted to the vehicle, so that the difference of noise between the right and left sides of the vehicle can be reduced. This arrangement, along with the discontinuous arrangement of the apex portions of the herringbone pattern of the sub-grooves 2, can simultaneously reduce the noise of both right and left tires of the vehicle.

In the pneumatic tire having an asymmetric tread pattern wherein the ribs continuing in the tire circumferential direction are disposed at the shoulder end portions on the tread surface positioned on the outer side when the tires are fitted to the vehicle, and block lines each comprising a plurality of blocks are disposed at the shoulder end portions of the tires on the inner side of the vehicle, the present invention described above disposes the sub-grooves extending in the tire width-wise direction while forming right and left pairs on the portion of the tire more inward than the ribs at a predetermined pitch in the tire circumferential direction and in a herringbone pattern widening in a direction opposite to the tire rotating direction, positions the apexes of this herringbone pattern on the tire outer side with respect to the tire equator line, and makes pairs of right and left sub-grooves mutually discontinuous at these apex portions. Therefore, the present invention can improve driving performance on the wet road surface while keeping driving performance on the dry road surface which is improved by the asymmetric tread pattern in which the ribs are provided at the outer shoulder end portion.

In addition to the disposition of the ribs on the shoulder portions on the outer side of the vehicles, the apex portions of the herringbone shape of the sub-grooves are made discontinuous. Accordingly, the tread patterns of the right and left tread patterns can be brought into mirror symmetry with respect to the center of the vehicle when the tires are fitted to the vehicle, and the difference of the noise between the right and left sides of the vehicle can be reduced.

EXAMPLE

Figure 3:
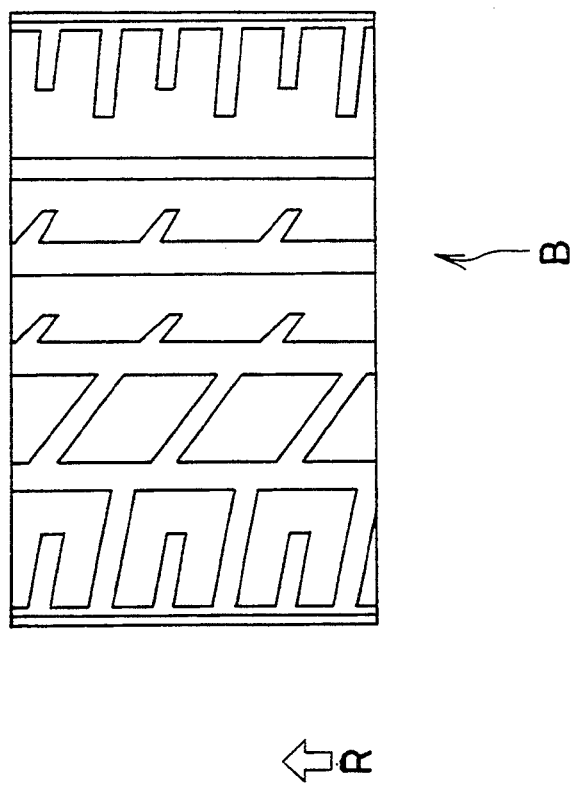
FIG. 3 is a development view showing a tread surface of a pneumatic tire according to the prior art.
Figure 3:
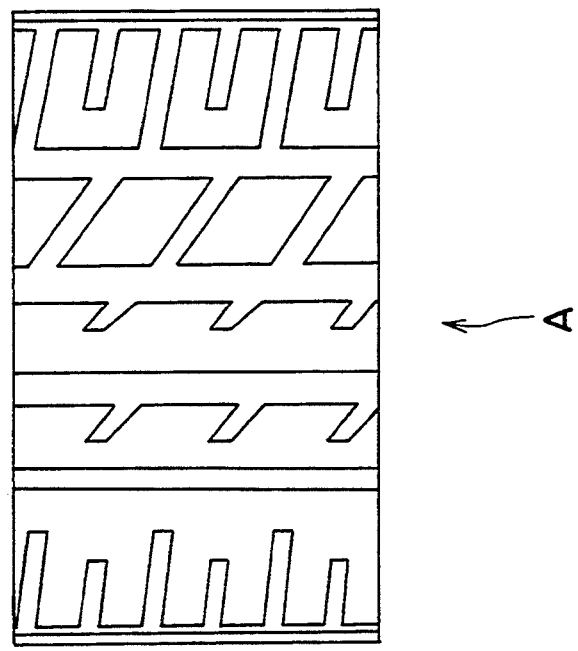

A tire of the present invention having the tread pattern (a/W=0.2) shown in FIG. 1 and a conventional tire having the tread pattern shown in FIG. 3 were produced while a tire size of the front wheels and that of the rear wheels were set commonly to 205/50ZR17 and 255/40ZR17, respectively. Conventional tires, one for mounting to a left side wheel and the other for mounting to a right side wheel of a vehicle, are produced by a same molding die in a manner such that they have an asymetrical tread pattern, and in mounting the tires to the vehicle, one of the tires is reversed in the mounting-position relative to the other so that the rib of each tire is on the outer side of the vehicle, therefore in the condition of the tires being mounted to the vehicle, the tires are not possessed of a directional characteristics.

These two kinds of tires were fitted to a four-wheeled vehicle, and their driving performance on a wet road surface and noise performance were evaluated in accordance with the following testing method.

Driving Test Performance on Wet Road Surface

Figure 4:
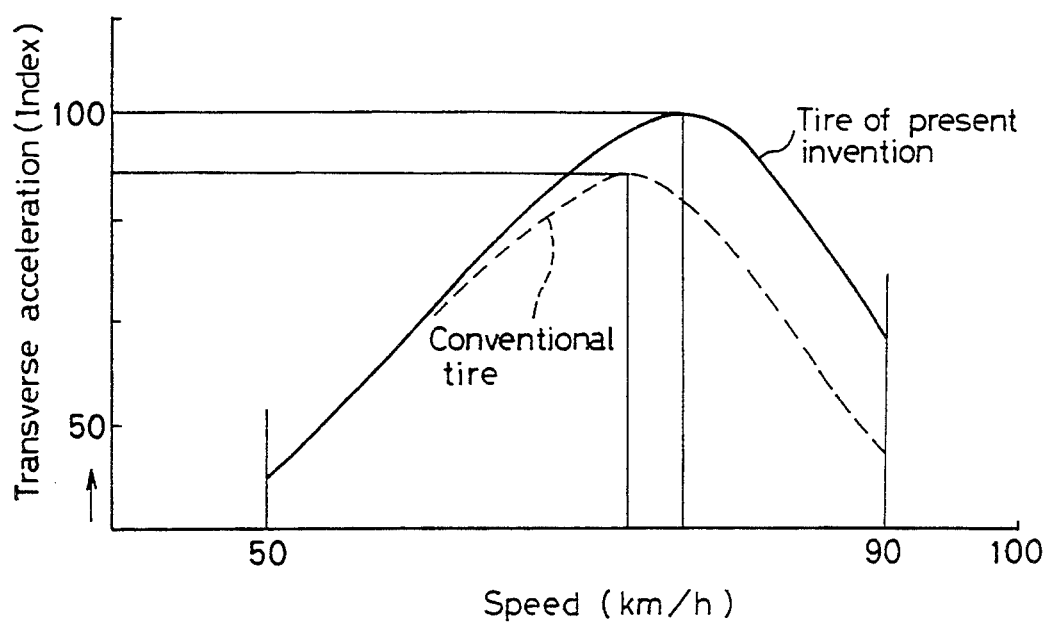
FIG. 4 is a diagram showing the relation between a turning speed and acceleration in a transverse direction that occurs on a wet road surface.

A wet road surface having the depth of water of 10 mm was disposed at a part of an annular testway having a radius of 100 m, and the running speed of the vehicle on this testway was changed within the range of 50 to 90 km/h so as to measure acceleration in the transverse direction on the wet road surface. The result of measurement was shown in FIG. 4 by the use of an index with the maximum transverse acceleration of the present tire being 100. In FIG. 4, an areas defined by the transverse acceleration curves within the speed range of 50 to 90 km/h and a speed generating the maximum transverse acceleration were tabulated in Table 1 by indices using the values of the conventional tire as 100.

Noise Performance Test

Sound pressure level [dB(A)] on the right and left sides of the vehicle were measured, respectively, in accordance with an acceleration noise testing method stipulated by ISO 362. The evaluation result was expressed by the difference [dB(A)] from a reference level which was the measurement level of the conventional tire on the left side of the tire.

TABLE 1

|  | conventional tire | tire of present invention |
|---|---|---|
| area of transverse acceleration curve | 100 | 123 |
| speed generating maximum acceleration | 100 | 106 |

As can be seen clearly from FIG. 4 and Table 1, the tire of the present invention had excellent draining property, and generated always a greater acceleration that the conventional tire because the present tire had great grip force on the wet road surface. The generation speed of the maximum transverse acceleration represents a critical speed before hydroplaning occurs. The present tire had a higher critical limit than the conventional tire; hence, hydroplaning was less likely to occur in the present tire.

TABLE 2

|  | conventional tire | tire of present invention |
|---|---|---|
| sound pressure level, dB(A) |  |  |
| left side | reference | −0.9 |
| right side | −1.2 | −1.5 |
| difference between left side and right side [dB(A)] | 1.2 | 0.6 |

As is obvious from Table 2, on the other hand, the sound pressure level was smaller in the present tire than in the conventional tire fitted to the left side of the vehicle and moreover, the difference in the sound pressure level between the right and left sides of the vehicle became smaller, too.

What is claimed is:

1. A pneumatic tire having an asymmetric tread pattern in which a shoulder rib continuing in a tire circumferential direction is disposed on a tread surface at a shoulder end portion on the outer side of a vehicle when said tire is fitted to the vehicle, and block lines each comprising a plurality blocks are disposed at a shoulder end portion on the inner side of the vehicle, said pneumatic tire further including paired: left and right sub-grooves extending in a tire width-wise direction disposed on the portion of said tire more inward than said shoulder rib at a predetermined pitch in the tire circumferential direction, said paired left and right sub-grooves positioned within respective left and right further ribs in a herringbone pattern widening in a direction opposite to a rotating direction of said tire, apexes of said herringbone pattern being positioned on the outer side of said tire with respect to a tire equator line, said paired right and left sub-grooves being mutually discontinuous at said apexes and open at their other ends to circumferentially extending main grooves; and a further main groove extending in the tire circumferential direction and disposed between said further ribs at said apex portions of said herringbone pattern of said sub-grooves.

2. A pneumatic tire according to claim 1, wherein said apexes of said herringbone patterns of said sub-grooves are spaced apart outward by a distance a from said tire equator line, and a ratio a/W of said distance a to a tread ground contact width W of said tire is set to be within the range of 0.1 to 0.4.

3. A pneumatic tire according to claim 1 wherein said left and right sub-grooves are symmetrically paired.

* * * * *